United States Patent [19]
Yagi et al.

[11] Patent Number: 5,336,887
[45] Date of Patent: Aug. 9, 1994

[54] SCANNING PROBE MICROSCOPE

[75] Inventors: Akira Yagi, Sagamihara; Hirofumi Miyamoto, Tokyo, both of Japan

[73] Assignee: Olympus Optical Co., Ltd., Tokyo, Japan

[21] Appl. No.: 975,598

[22] Filed: Nov. 12, 1992

[30] Foreign Application Priority Data

Nov. 15, 1991 [JP] Japan ................................. 3-300687
May 27, 1992 [JP] Japan ................................. 4-135318

[51] Int. Cl.$^5$ ............................................. H01J 37/00
[52] U.S. Cl. ................................................... 250/306
[58] Field of Search ............................... 250/306, 307

[56] References Cited

U.S. PATENT DOCUMENTS

| | | | |
|---|---|---|---|
| 4,343,993 | 8/1982 | Binnig et al. | 250/306 |
| 4,724,318 | 2/1988 | Binnig | 250/306 |
| 4,823,004 | 4/1989 | Kaiser et al. | 250/306 |
| 5,036,196 | 7/1991 | Hosaka et al. | 250/423 F |
| 5,144,128 | 9/1992 | Hasegawa et al. | 250/306 |
| 5,168,159 | 12/1992 | Yagi | 250/306 |

OTHER PUBLICATIONS

"Scanning Tunnelling and Atomic Force Microscopy Performed With the Same Probe In One Unit"; by P. J. Bryant et al; vol. 152, Pt. 3, Dec. 1988, pp. 871–875.

Primary Examiner—Bruce C. Anderson
Attorney, Agent, or Firm—Frishauf, Holtz, Goodman & Woodward

[57] ABSTRACT

A sample is mounted on a piezoelectric actuator and a cantilever provided with a probe is located thereabove. A bias voltage applying circuit supplies the sample with a potential difference $V_T$ and sends out a current signal $I_T$ representing the electric current flowing between the sample and the probe to a current detecting circuit. The current signal is converted into $\log I_T$ in a logarithmic amplifier and given to a differential amplifier. A displacement detecting circuit is arranged above the cantilever for detecting the displacement of the free end of the cantilever due to the atomic force appearing between the sample and the probe and for sending a displacement signal $Z_{TIP}$ representing the displacement to another differential amplifier. The signals from the differential amplifiers are respectively fed to terminals of an analog switch. The analog switch selects a signal to be fed to a control circuit, which control circuit generates and transmits a signal $V_Z$ as a function of the signal it receives, thereby controlling the actuator.

18 Claims, 10 Drawing Sheets

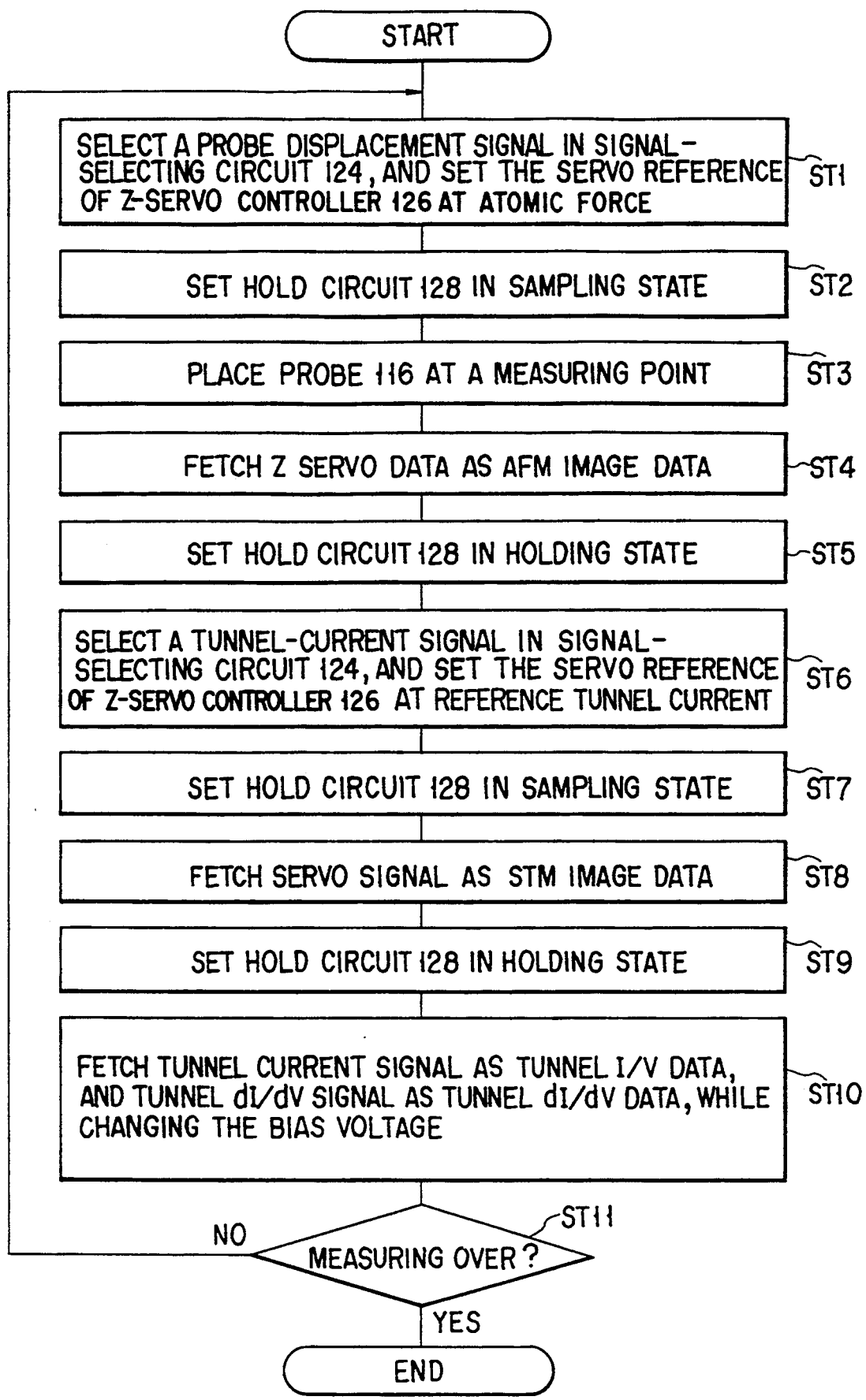
F I G. 5

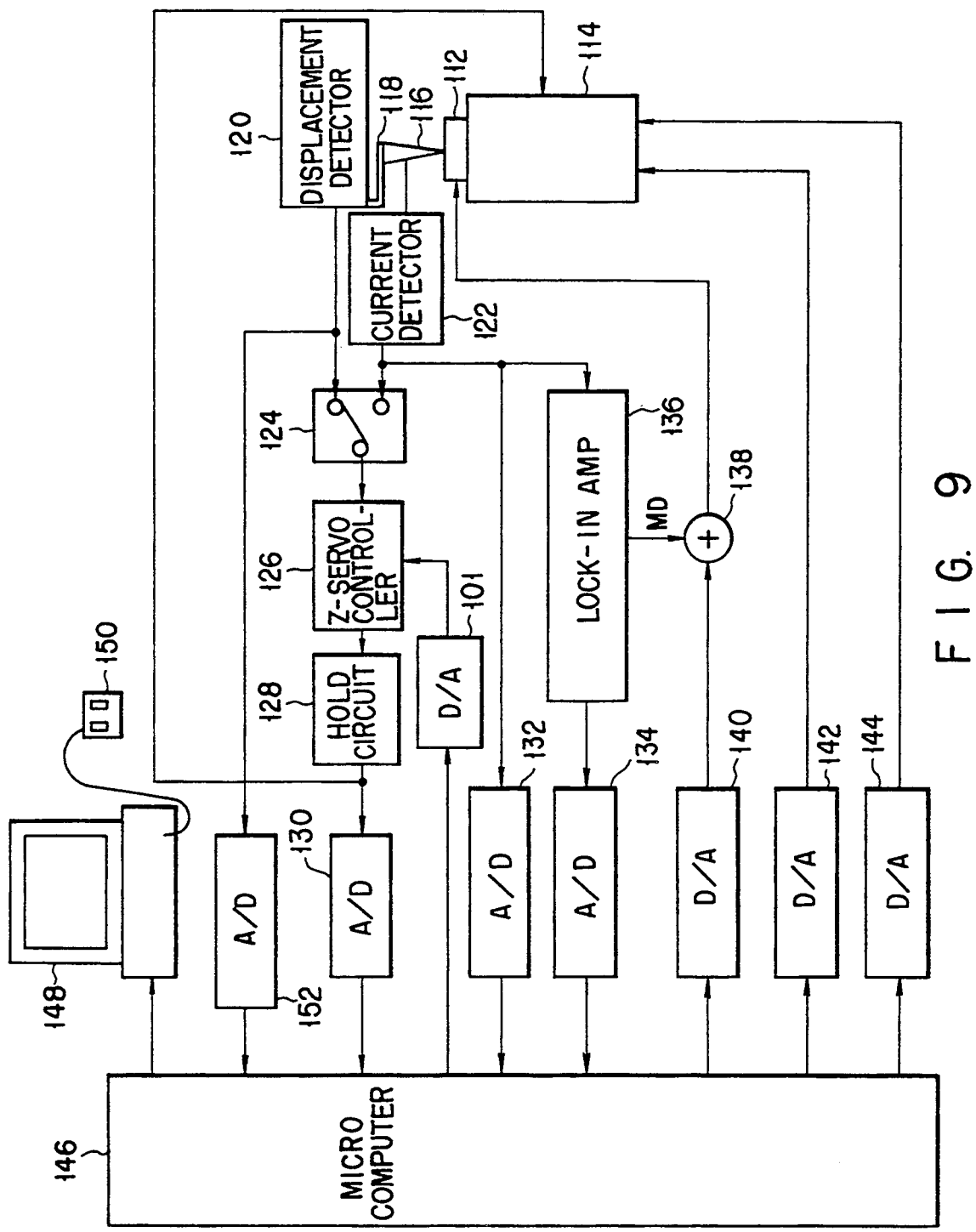
F I G. 9

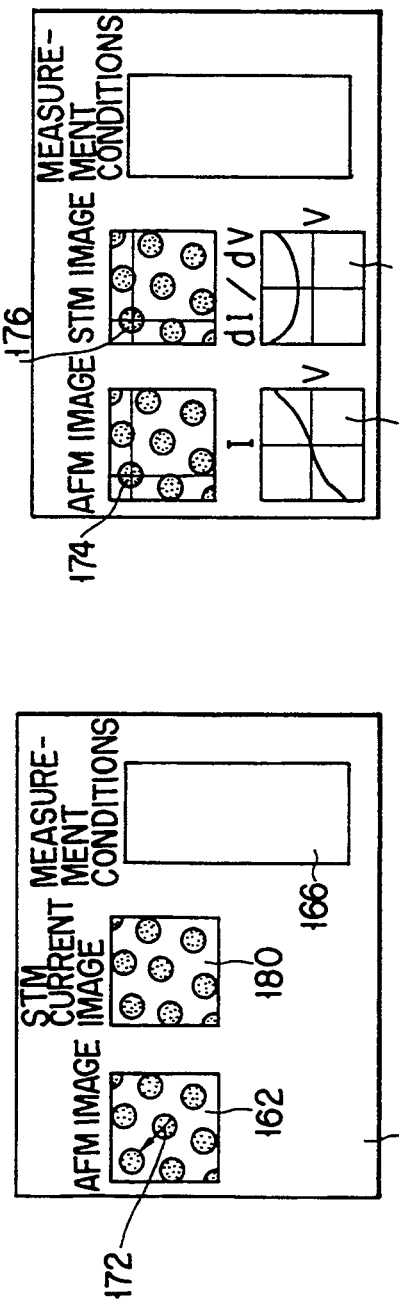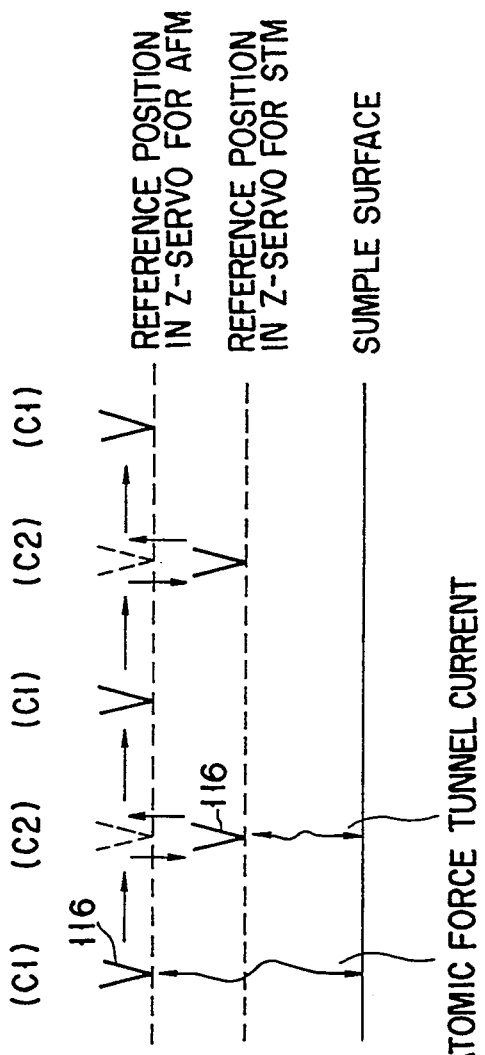

SCANNING PROBE MICROSCOPE

BACKGROUND OF THE INVENTION

1. Field of the Invention

This invention relates to a scanning probe microscope comprising a sharply pointed probe to be placed near the surface of a sample for scanning the surface and for collecting data therefrom.

2. Description of the Related Art

Scanning probe microscopes are known as instruments to observe the atomic state of the surface of samples and include, among others, a scanning tunnel microscope (STM) and an atomic force microscope (AFM).

As described in U.S. Pat. No. 4,343,993 and other documents, an STM is a microscope that utilizes a tunnel current $I_T$ that runs as a tunnel effect between the conductive probe of the microscope placed as close as several nanometers to the conductive surface of a sample at a rate that exponentially depends on the distance S between the probe and the sample and the barrier height $\phi$ (as expressed by equation $I_T = B(V_T)\exp(-A\phi^{\frac{1}{2}}S)$; where $B(V_T)$ is a coefficient dependent on the bias voltage, A is a numeral coefficient equal to $10.25^{-1}(eV)^{-\frac{1}{2}}$, $\phi$ is the barrier height and S is the distance between the probe and the sample) in such a manner that the tunnel current $I_T$ is kept constant as the surface of the sample is scanned by the probe in order to collect data representing the state and the conductivity of the surface as minute as the level of atomic dimensions.

On the other hand, an AFM is, as described in documents such as U.S. Pat. No. 4,724,318, an instrument designed to detect the deflection (displacement) of its cantilever caused by a minute atomic force (such as a repulsive force attributable to the exclusion principle, a vander Waal's force or a covalent bond force) that can be expressed in terms of Lennard Jones potential and controlling the movement of its probe and hence the positional relationship between the probe and the surface of a sample in such a manner that the force may always be kept constant so that consequently the state of the sample can be observed by a resolution of atomic order.

The tunnel current detected by a STM reflects the state density of local electric charges of the sample as well as local electric potentials and the distance between the probe and the sample. In other words, an image of a sample obtained by a STM normally contains data on the fine configuration or coarseness of the surface, those on the state density of local electric charges and those on local electric potentials of the sample. In order to avoid this problem, there have been developed a technique called scanning tunnel spectroscopy (STS) that can selectively collect data on the electronic state of the surface of a sample by separating them from those on the fine configuration of the surface to produce a three dimensional image (STS image) of the sample and a technique of scanning tunnel potentiometry (hereinafter STP) that collects data on the distribution of electric charges on the surface of a sample to produce a three dimensional image (STP image) of the sample. U.S. patent application Ser. No. 07/585,880, now U.S. Pat. No. 5,185,572, assigned to the same assignee as the present application, discloses an apparatus that can obtain an STS image and an STP image of a sample simultaneously.

The applicant of the present invention has also proposed an AFM/STS system that can determine the surface configuration of a sample by using a conductive cantilever for instrumentation and the principle of AFM and, at the same time, obtain a scanning tunnel microscopic image (STM image) by detecting the tunnel current running between the probe of the microscope and the sample.

With an STM, the configuration of the surface of a sample is determined by so controlling the distance between the sample and the probe of the microscope as to maintain the tunnel current at a constant level. If, however, the surface of the sample has areas that are not or only poorly conductive to electricity, the tunnel current does not will hardly pass through there and the tip of the probe can be pressed against the surface of the sample until the probe and/or the sample are irreversibly deformed. If such is the case, the image obtained by the STM does not correctly reflect the surface of the sample.

While an accident of pushing the surface of a sample with the probe can be avoided in an above described system if the surface of an sample is observed only by an AFM under the control of the AFM servo of the system, the operation of the system in such a manner may be accompanied by problems. When a sample is observed by both the AFM and the STM simultaneously under the control of the AFM servo and the probe comes to a highly conductive area of the surface of the sample, an excessively large electric current can appear due to the exponential dependency of tunnel current on the distance to heat the tip of the probe and thermally change the composition of and/or deform the probe and the sample when a repulsive force involved in the system comes within a range predetermined for the ATM if the distance that triggers a tunnel current exceeds the effective range of the repulsive force defined for the servo by the system.

SUMMARY OF THE INVENTION

It is therefore an object of the present invention to provide a scanning probe microscope that can effectively prevent any damage to the probe and/or the sample from occurring and, at the same time, observe the three dimensional configuration and the distribution of electric conductivity on the surface of the sample.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flow chart illustrating a procedure of conducting a measurement by using the embodiment of FIG. 4;

FIG. 9 is a circuit diagram of a scanning probe microscope obtained by modifying the embodiment of FIG. 4;

FIGS. 10A and 10B are typical images appearing on the display screen of the microscope of FIG. 9;

FIG. 11 is a schematic view illustrating the positional relationship between the sample and the probe that can be obtained when the procedure of FIG. 5 is followed.

DETAILED DESCRIPTION OF THE PREFERRED EMBODIMENTS

Figure 1:
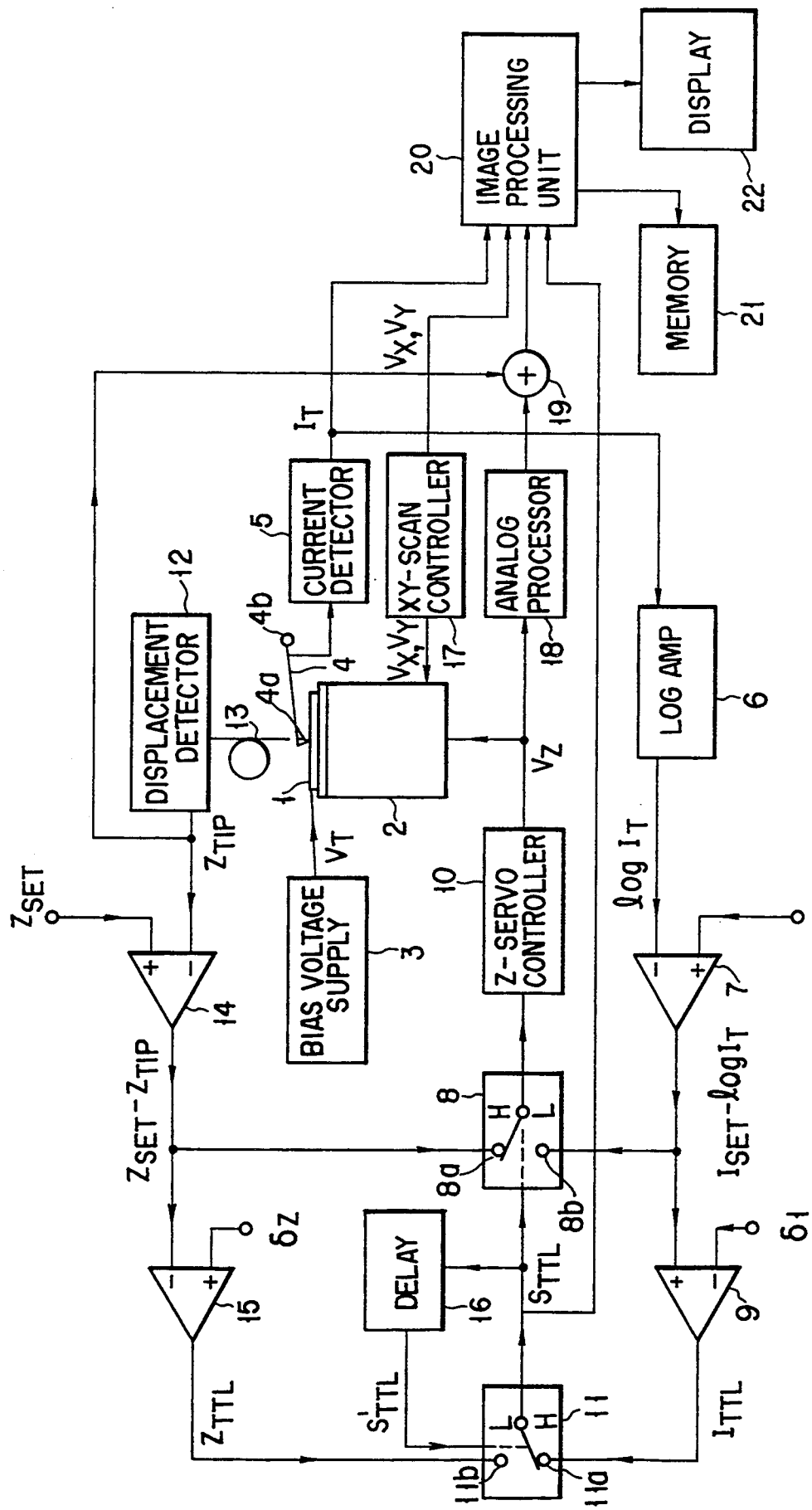
FIG. 1 is a circuit diagram of a first embodiment of a scanning probe microscope of the invention.

Now, the present invention will be described in greater detail by referring to the accompanying drawings that illustrate preferred embodiments of the invention. Referring firstly to FIG. 1 that illustrates a first embodiment of the invention, a sample 1 is held onto a piezo-electric actuator 2 which is three-dimensionally and finely movable within a predetermined range. Above the sample 1, there is disposed a cantilever 4 having a free end, on which a probe 4a having a tip pointing to the sample 1 is fitted. The cantilever 4 is so formed with a selected material as to have a given spring constant.

A voltage is applied to the sample 1 by a bias voltage applying circuit 3 connected thereto to produce a potential difference $V_T$ between the sample 1 and the probe 4a. The probe 4a is connected to a current detecting circuit 5 for detecting a tunnel current that flows between the probe 4a and the sample 1 when a potential difference $V_T$ is produced there. The tunnel current signal $I_T$ transmitted from the current detecting circuit 5 is varied as an exponential function of the distance between the tip of the probe 4a and the surface of the sample 1. In order to convert the signal into a signal that varies proportionally to the distance, the tunnel current signal $I_T$ is fed to a logarithmic amplifier 6 and compared with a reference value $I_{SET}$. The differential amplifier 7 sends out a signal representing $I_{SET}$-$logI_T$, which is fed to a terminal 8b of the analog switch 8 and the noninverting input terminal of the comparator 9. When the STM control mode is operational, the signal $I_{SET}$-$logI_T$ is fed to a control circuit or Z-servo controller 10 by way of the analog switch 8 and the control circuit 10 transmits a signal $V_Z$ to control the piezoelectric actuator 2 so that the value of $I_{SET}$-$logI_T$ is held equal to 0.

On the other hand, a probe displacement detecting circuit 12 is disposed above the free end of the cantilever 4. The probe displacement detecting circuit 12 irradiates the free end of the cantilever 4 by way of an optical fiber 13 and receives the reflected light to detect any vertical displacement (in the Z-direction) of the free end of the cantilever 4, utilizing the phenomenon of optical interference. Since the cantilever 4 has a given spring constant, its free end is vertically displaced in the Z direction in proportion to the force (atomic force) existing between the probe 4a and the sample 1. Thus, the displacement signal $Z_{TIP}$ generated by the probe displacement detecting circuit 12 represents the force existing between the probe 4a and the sample 1. The displacement signal $Z_{TIP}$ is then fed to a differential amplifier 14, which compares it with a reference value $Z_{SET}$. The differential amplifier 14 then transmits a signal representing $Z_{SET}$-$Z_{TIP}$ to a terminal 8a of an analog switch 8 and the noninverting input terminal of a comparator 15. When the AFM (atomic force microscope) control mode is operational, the signal $Z_{SET}$-$Z_{TIP}$ is fed from the differential amplifier 14 to the control circuit 10 via the analog switch 8 and the control circuit 10 sends out a signal $V_Z$ generated from the above signal to control the piezoelectric actuator 2 in such a manner that the value of $Z_{SET}$-$Z_{TIP}$ is kept to 0.

In a scanning probe microscope according to the invention, the STM control mode is switched to the AFM control mode whenever the atomic force exceeds a predetermined value and the latter mode is switched to the former mode whenever the tunnel current exceeds a predetermined level. Now, the switching operation will be described below.

The comparator 9 compares the signal $I_{SET}$-$logI_T$ and offset positive voltage $\delta_1$ and the outcome of the comparison is transmitted in the form of a signal $I_{TTL}$, which indicates an L level when the tunnel current exceeds the predetermined value or the relationship $I_{SET}$-$\delta_1 \leq logI_T$ holds true, and a H level when the tunnel current is below the predetermined value or the relationship $I_{SET}$-$\delta_1 > logI_T$ is established.

The comparator 15 compares the signal $Z_{SET}$-$Z_{TIP}$ and the offset positive voltage $\delta_Z$ and transmits a signal $Z_{TTL}$, which indicates a H level when the displacement of the probe exceeds the predetermined value or the relationship $Z_{SET}$-$\delta_Z \leq Z_{TIP}$ holds true, and an L level when the displacement of the probe is below the predetermined value or the relationship $Z_{SET}$-$\delta_Z > Z_{TIP}$ is established.

The signals $I_{TTL}$ and $Z_{TTL}$ are respectively fed to terminals 11a and 11b of another analog switch 11, which, upon receiving the signals, transmits a signal $S_{TTL}$ for switching the analog switch 8 and is switched by a signal $S'_{TTL}$ generated by a delay circuit 16 having a given time constant on the basis of the signal $S_{TTL}$ transmitted therefrom. Said analog switch 11 closes the terminal 11a when the input signal $S'_{TTL}$ is at the H level and alternatively closes the terminal 11b when the input signal $S'_{TTL}$ is at the L level. Therefore, the signal $S_{TTL}$ is the same as the signal $Z_{TTL}$ in the STM control mode and the same as the signal $I_{TTL}$ in the AFM control mode. The signal $Z_{TTL}$ which is normally at the L level is turned to the H level when the atomic force is increased. On the other hand, the signal $I_{TTL}$ is normally kept to the H level and turned to the L level when the tunnel current is increased. Like the analog switch 11, the analog switch 8 closes the terminal 8a when the input signal $S_{TTL}$ is at the H level and alternatively closes the terminal 8b when the input signal $S_{TTL}$ is at the L level. So, the STM control mode is changed over to the AFM control mode when the atomic force exceeds the predetermined level while it is operational and the AFM control mode goes to the STM control mode when the tunnel current exceeds the predetermined value while it is operational.

Thus, with the arrangement of automatic change over between the AFM and STM control modes, it will be understood that the value $V_Z \times D_Z$ obtained in an analog arithmetic unit 18 by multiplying the output signal $V_Z$ of the control circuit 10 by the vertical piezoelectric constant $D_Z$ of the piezoelectric actuator 2 that carries the sample 1 always correctly reflects the movements of the sample that correspond to the configuration of the surface of the sample if they are observed simply by an AFM or an STM, although it may be disadvantageous for such a dual system comprising an elastically movable probe that the configuration of the surface of a sample needs to be determined by considering both the signal $V_Z$ and the displacement signal $Z_{TIP}$.

In order to bypass the problem in the above embodiment, a signal $V_Z \times D_Z + Z_{TIP}$ obtained by adding the signal $V_Z \times D_Z$ coming from the analog arithmetic unit or analog processor 18 and the displacement signal $Z_{TIP}$ in an adder 19 is fed to a image processing unit 20 as data representing the height of the sample. The image processing unit 20 synchronizes the signal $V_Z \times D_Z + Z_{TIP}$ coming from the adder 19 and scanning signals $V_X$ and $V_Y$ coming from an X-Y scanning control circuit or XY-scan controller 17 before it processes them to produce data on the configuration of the surface of the sample. The image data processing unit 20 also synchronizes the tunnel current signal $I_T$ and the scanning signals $V_X$ and $V_Y$ and processes them to produce data on the distribution of currents on the surface of the sample that falls short of a reference value. Additionally, the image processing unit 20 synchronizes and processes the control mode switching signal $S_{TTL}$ and the scanning signals $V_X$ and $V_Y$ to obtain a double digit data on the distribution of current flowability on the surface of the sample. The data on the configuration and current distribution on the surface of the sample are stored in a memory 21 and displayed on a display unit 22 such as a CRT. With such an arrangement, it will be seen that data on the configuration and conductivity distribution of the surface of the sample can be obtained, constantly maintaining the atomic force under a reference value ($Z_{TIP} \leq Z_{SET}$).

Now, signals involved in the embodiment of FIG. 1 will be described by referring to FIG. 2.

Figure 2:
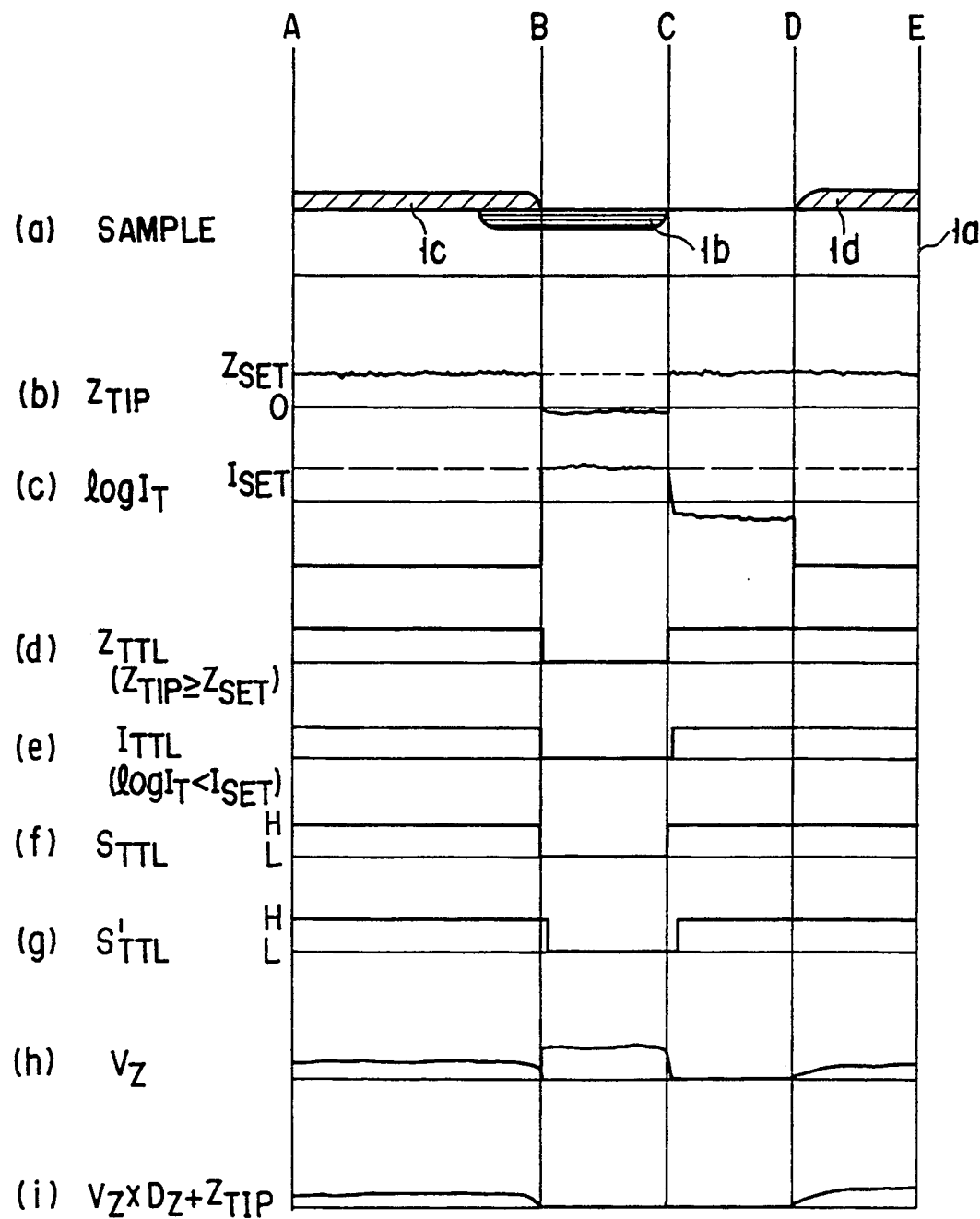
FIGS. 2a–i is a schematic sectional view of a sample to be scanned by a scanning probe microscope according to the invention and an illustration of changes in the level of various signals that can be detected when the surface of the sample is scanned.

(a) in FIG. 2 shows a sectional view of the sample as cut along the direction of scanning. The sample 1 is a semiconductor substrate 1a comprising a metal section 1b disposed in the middle and the surface is covered by a pair of insulating members 1c and 1d respectively at the left and right ends within the scope of scanning. The surface of the insulating member 1c is flat between points A and B. The span between points B and D shows a surface level lower than that of the surface of the insulating member 1c and the metal section 1b is partly exposed between points B and C, whereas the semiconductor substrate 1a is partly exposed between points C and D. The semiconductor substrate 1a is then covered between points D and E by the insulating member 1d having a height substantially equal to that of the insulating member 1c.

(b) shows the output signal $Z_{TIP}$ of the probe displacement detecting circuit 12. The level of the signal is equal to 0 when the sample does not exert any force on the probe 4a. The positive displacement zone is an area where the sample 1 exerts a repulsive force on the probe 4a, whereas the negative displacement zone is an area where the sample 1 exerts a pulling force on the probe 4a. The broken line in the positive displacement zone indicates the reference value $Z_{SET}$ used in the differential amplifier 14.

(c) shows a logarithmic signal $\log I_T$ of the tunnel current signal $I_T$ running between the sample and the probe 4a. The solid line indicates the reference value that corresponds to a current of approximately 1 nA, whereas the broken line indicates the reference value $I_{SET}$ used in the differential amplifier 7.

(d) shows the output signal $Z_{TTL}$ of the comparator 15, which is at the L level between points B and C where the signal $Z_{TIP}$ of (b) above falls short of the reference value $Z_{SET}$.

(e) shows the output signal $I_{TTL}$ of the comparator 9, which is at the L level between points B and C where the signal $\log I_T$ of (c) above agrees with the reference value $I_{SET}$.

(f) shows the control mode switching signal $S_{TTL}$ for the piezoelectric actuator 2, which is equal to $Z_{TTL}\cdot Z_{TIP}$ when the input of the control circuit 10 is at the H level and equal to $I_{SET}\cdot\log I_T$ when the input of the control circuit 10 is at the L level.

(g) shows the signal $S'_{TTL}$ to be used for switching the analog switch 11 that selects either $Z_{TTL}$ of $I_{TTL}$ for automatic change-over of control mode. The signal $S'_{TTL}$ is obtained by entering the signal $S_{TTL}$ into the delay circuit 16 and has a waveform obtained by shifting that of (h) below by a given time period. When the signal $S'_{TTL}$ is at the H level, the signal $S_{TTL}$ is equal to the signal $I_{TTL}$, whereas it is equal to the signal $Z_{TTL}$ when the signal $S'_{TTL}$ is at the L level.

(h) shows the output signal $V_Z$ of the control circuit 10, which operates such that the sample is lowered by a positive voltage.

(i) shows the signal $V_Z \times D_Z + Z_{TIP}$ representing the configuration of the surface of the sample.

Now, if the sample 1 is moved in the X-direction by means of the piezoelectric actuator 2 for scanning by the probe 4a, no tunnel current $I_T$ is observed between points A and B as shown by (c) because of the insulating member 1c on the surface of the semiconductor substrate and therefore the signal $I_{TTL}$ is kept to the H level as shown in (d). Under this condition, the signal $Z_{TIP}$ is pushed up to the reference level $Z_{SET}$ as shown in (b), whereas the signal $Z_{TTL}$ is set to the H level as illustrated in (d). So, the signal $S_{TTL}$ is at the H level to control the piezoelectric actuator 2 in the AFM control mode. Thus, the signal $V_Z$ as shown in (h), that the control circuit 10 produces under this condition, reflects the configuration of the surface of the sample and the cantilever displacement signal $Z_{TIP}$ is kept to a constant level as shown in (b). Meanwhile, the signal $S'_{TTL}$ is kept to the H level as illustrated in (g) and the operation of control mode switching is carried out on the basis of the tunnel current signal $I_T$.

When the probe 4a reaches point B where the metal section 1b starts covering the surface of the sample, the tunnel current signal $I_T$ begins to fluctuate as a function of the bias voltage $V_T$ and the electronic condition of the surface of the sample. If the $\log I_T$ is increased to reach the level of $I_{SET}$, the signal $S_{TTL}$ and therefore the signal $I_{TTL}$ are switched to the L level so that the input to the control circuit 10 is switched to the signal $I_{SET}$-$\log_T$ to select the STM control mode. Then, as shown in (h), the signal $V_Z$ is transmitted to the piezoelectric actuator 2 to lower the sample 1 and therefore the level of the $Z_{TIP}$ from $Z_{SET}$ to below 0 as shown in (b) and the signal $Z_{TTL}$ turns to the L level as shown in (d). Under this condition, the configuration of the surface of the sample is represented by the signal of (i) obtained by adding the product of the vertical piezoelectric constant $D_Z$ of the piezoelectric actuator 2 and the control voltage $V_Z$ to the signal $Z_{TIP}$ representing the displacement of the probe 4a.

When the various signals are mutually compared at and near point B, it will be seen that a time period $T_S$ is required as a function of the time constant of the control circuit 10 from the time when the signal $S_{TTL}$ of (f) goes to the L level to the time when the signal $Z_{TTL}$ of (d) falls to the L level. While the signal $Z_{TTL}$ is used for the signal $S_{TTL}$ in the STM control mode in order to avoid any excessive force from being exerted on the probe 4a by the sample, the signal $S_{TTL}$ abruptly turns to the H level at the time if the signal $I_{TTL}$ is replaced by the signal $Z_{TTL}$ for the signal $S_{TTL}$ as soon as the signal $S_{TTL}$ is turned to the L level. Such unstable behavior on the part of the signal $S_{TTL}$ is not acceptable because the microscope can go beyond control under such condition. In order to avoid such condition, the signal $S'_{TTL}$ is generated by introducing the signal $S_{TTL}$ into the delay circuit 16 to delay the timing of the switching operation of the signal $S_{TTL}$ so that the analog switch 11 is operated with the timing of the generated signal $S'_{TTL}$. For this purpose, the time constant $T_p$ of the delay circuit 16 is so selected as to become longer than the time $T_S$ that passes from when the signal $I_{TTL}$ turns from the H to the L level to when the signal $Z_{TTL}$ turns to the L level. With such an arrangement, it will be understood that the signal $S'_{TTL}$ is held to the H level during the delay time $T_p$ from point B and the signal $I_{TTL}$ continues to be used for the control mode switching signal $S_{TTL}$, which is therefore held to the L level. Thereafter, the signal $S'_{TTL}$ turns to the L level and the signal $Z_{TTL}$ comes to be used for the control mode switching signal $S_{TTL}$.

Thereafter, between points B and C, the embodiment operates in the STM control mode and so $\log I_T$ is held to the reference value $I_{SET}$ as shown in (c). As shown in (b), the signal $Z_{TIP}$ is lower than the signal $Z_{SET}$ and the signal $Z_{TTL}$ is held to the L level. As a matter of course, the signal $I_{TTL}$ is held to the L level during this period to prevent any excessive current from flowing between the sample and the probe.

When the probe 4a reaches point C in the STM control mode, the electric conductivity of the surface of the sample is reduced to lower the level of the tunnel current $I_T$ as illustrated in (c) because the metal section 1b is terminated and the semiconductor substrate 1a surfaces. At the same time, the output signal $V_Z$ of the control circuit 10 is so changed as to push up the sample 1 by means of the piezoelectric actuator 2. Then, the atomic force existing between the sample 1 and the probe 4a is increased to push up the cantilever 4 and raise the value of the signal $Z_{TIP}$ as shown in (b) until the predetermined amount of displacement $Z_{SET}$-$\delta_Z$ is reached, when the signal $Z_{TTL}$ is turned from the L level to the H level and the control mode switching signal $S_{TTL}$ is set to the H level so that now the signal $Z_{TTL}$-$Z_{TIP}$ is given to the control circuit 10 to change the control mode from STM to AFM.

Under this condition again, a time period $T_S$ needs to pass for the signal $I_{TTL}$ to turn from the L to the H level or from the time when the signal $S_{TTL}$ turns to the L level to the time when the signal $I_{TTL}$ turns to the H level. Therefore, the analog switch 11 is operated by using the signal $S'_{TTL}$ obtained by introducing the signal $S_{TTL}$ into the delay circuit 16 having a time constant $T_p$. Thus, after the time corresponding to the time constant of the delay circuit has passed since the AFT control mode came into operation, the signal $I_{TTL}$ comes to be used for the control mode switching signal $S_{TTL}$ and the AFT control mode continues to be effective until equation $\log I_T = I_{SET}$ holds true for the tunnel current $I_T$. Under this condition, the tunnel current $I_T$ fluctuates as a function of the electronic condition of the surface of the sample. The operation of scanning the surface of the sample continues in the AFM control mode between points D and E and the tip of the probe 4a responds to the configuration of the surface of the insulating member 1d of the sample. So, the signal $V_Z$ as shown in (h) represents the configuration and the signal $\log_T$ represents the conductivity of the surface of the sample between points C and E.

Thus, the configuration and the electronic condition of the surface of the sample can be comprehended by a single scanning operation respectively from the signals (i) and (c) within the limits of the respective threshold values for the force and the electric current existing between the sample 1 and the probe 4a.

Figure 3:
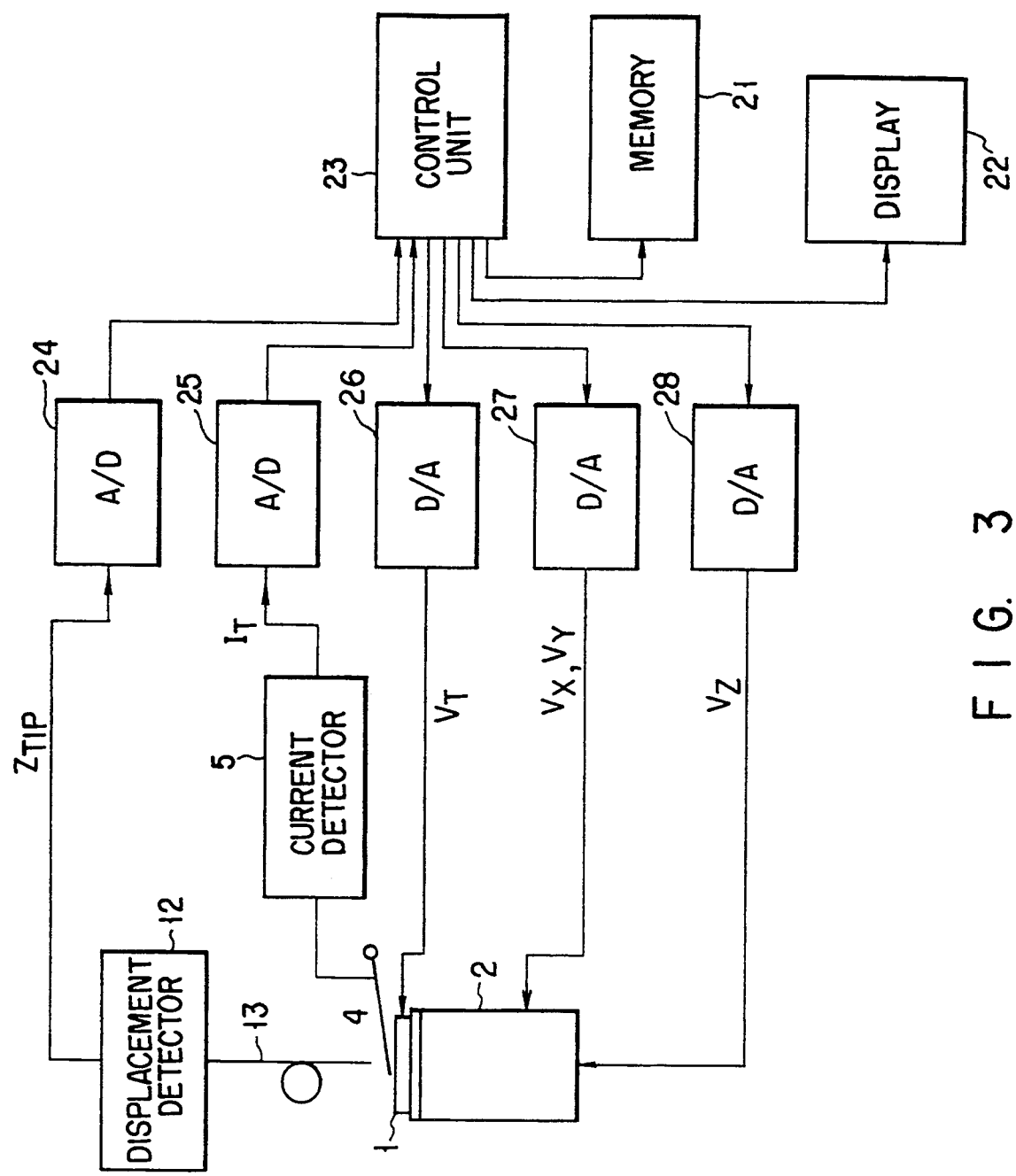
FIG. 3 is a circuit diagram of a scanning probe microscope obtained by modifying the microscope of FIG. 1.

FIG. 3 is a circuit diagram of a scanning probe microscope obtained by modifying the embodiment of FIG. 1. In FIG. 3, those components that are same as or equivalent to those of the embodiment of FIG. 1 are indicated by identical reference symbols and will not be described any further. The embodiment of FIG. 3 differs from that of FIG. 1 in that it comprises a control unit 23 and the scanning operation is controlled by using digital signals.

The control unit 23 generates and transmits data for signals that control the scanning operation of the embodiment where the piezoelectric actuator 2 is so controlled that the sample 1 is X-Y scanned by the probe 4a. The scanning signal data are converted into scanning signals $V_X$ and $V_Y$ by a D/A converter 27 and fed to the piezoelectric actuator 2. The control unit 23 also transmits bias voltage data for applying a voltage between the sample and the probe 4a. The bias voltage data are converted into a bias voltage signal $V_T$ by another D/A converter 26 and the signal is applied to the sample 1. The current detecting circuit 5 detects the tunnel current running through the probe 4a and sends out a tunnel current signal $I_T$ representing the tunnel current. The tunnel current signal $I_T$ is converted to tunnel current data by still another converter 25 and forwarded to the control unit 23 with a predetermined timing. Alternatively, the tunnel current signal $I_T$ may be converted to a signal $\log(I_T)$ which is proportional to the distance between the sample 1 and the probe 4a by means of a logarithmic amplifier disposed to the upstream of the A/D converter 25 and thereafter fed to the A/D converter 25. The probe displacement detecting circuit 12 detects the displacement of the probe and transmits a probe displacement signal $Z_{TIP}$. The A/D converter 24 converts the probe displacement signal $Z_{TIP}$ to probe displacement data, which are then forwarded to the control unit 23 with a predetermined timing.

The control unit 23 additionally transmits Z-direction control data for driving the piezoelectric actuator 2 so that the distance between the probe and the sample may be servo-controlled in a predetermined manner. Still another A/D converter 28 converts the Z-direction control data to a Z direction control signal $V_Z$, which Z-direction control signal $V_Z$ is then fed to the piezoelectric actuator 2. The servo-control function for controlling the distance between the probe and the sample is performed either in an STM servo-control mode where the tunnel current data $I_T$ are made equal to the predetermined current value $I_{SET}$ or in an AFM servo-control mode where the probe displacement data $Z_{TIP}$ are made equal to the predetermined probe displacement value $Z_{SET}$, the two modes being selected by means of the switching operation of the control unit 23 according to the data given to the control unit 23. Now the switching operation of the control unit 23 for selecting a control mode will be described below. While the symbol $I_T$ has been used to represent a tunnel current signal in the above description, hereafter it will also represent tunnel current data. Similarly, the symbol $Z_{TIP}$ will also represent probe displacement data hereafter.

The control unit 23 constantly compares the tunnel current data $I_T$ (or $\log(I_T)$) with the predetermined current value $I_{SET}$ and the probe displacement data $Z_{TIP}$ with the predetermined probe displacement value $Z_{SET}$ and produces Z-direction control data obtained on the basis of $I_T$-$I_{SET}$ (or $\log(I_T)$-$I_{SET}$) in the STM servo-control mode and $Z_{TIP}$-$Z_{SET}$ in the AFM servo-control mode, which are then sent out from the control unit 23. In the AFM servo-control mode, the AFM mode continues to be effective as long as the tunnel current signal $I_T$ (or $\log(I_T)$) is equal to or less than the predetermined current value $I_{SET}$ and is switched to the STM servo control mode when the tunnel current signal $I_T$ (or $\log(I_T)$) exceeds the predetermined current value $I_{SET}$. Similarly, the STM servo-control mode remains effective as long as the probe displacement signal $Z_{TIP}$ is equal to or less than the predetermined probe displacement value $Z_{SET}$ and is switched back to the AFM servo control mode when the probe displacement signal $Z_{TIP}$ exceeds the predetermined probe displacement value $Z_{SET}$.

Thus, as in the embodiment of FIG. 1, the modified embodiment operating in the STM servo-control mode is made to operate in the AFM servo-control mode when the atomic force exceeds a predetermined value and is then switched back to the STM servo control mode when the tunnel current becomes greater than the predetermined level.

The data on the configuration ($Z_{TIP}+V_Z \times D_Z$) and date on the conductivity of the surface of the sample can be obtained by arithmetically processing the obtained tunnel current data and probe displacement data in the control unit 23 and then further processing the resultant data and the servo control mode switching data after synchronizing them with scanning data. The obtained data are then stored in the memory 21 and displayed on the display screen 22.

Figure 4:
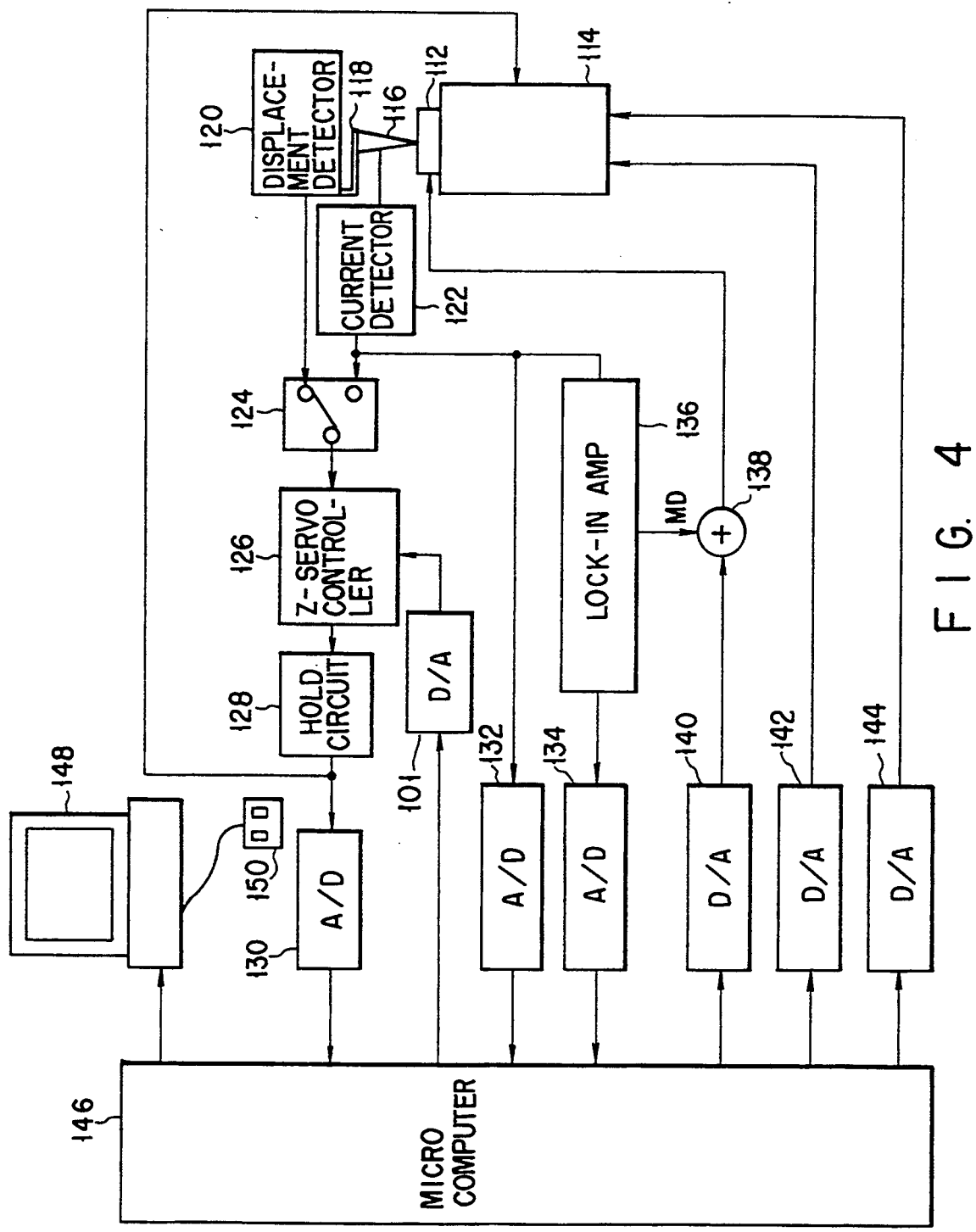
FIG. 4 is a circuit diagram of a second embodiment of a scanning probe microscope of the invention.

Now, a second embodiment of scanning probe microscope of the invention will be described. Referring to FIG. 4 illustrating the second embodiment, a sample 1 is mounted on an XYZ-driving piezoelectric actuator 114. The XYZ-driving piezoelectric member 114 moves the sample 112 according to X- and Y-scanning signals given to it by a microcomputer 146 via D/A converters 144, 146 so that the surface of the sample 114 is scanned by a probe 116 (in the X- and Y-directions). The XYZ driving piezoelectric member 114 also moves the sample 112 in a direction perpendicular to the surface of the sample 112 according to Z-servo signals. Thus, the XYZ-driving piezoelectric member 114 moves the sample 112 three dimensionally according to signals given to it. The probe 116 is conductive and located above the sample 112. The probe 116 is fitted to a free end of a resilient cantilever 118, which is resiliently deformed to displace its free end as a function of the atomic force that can be generated between the probe 116 and the sample 112. The displacement of the free end and therefore of the probe 116 is detected by a probe displacement detecting circuit 120. A bias voltage is applied to the sample 112 by an adder 138 to produce a tunnel current flowing between the probe 116 and the sample 112, which is detected by a tunnel current detecting circuit 122. The tunnel current detecting circuit 122 in turn sends out a tunnel current signal representing the detected tunnel current. The signal produced by the probe displacement detecting circuit 120 and representing the displacement of the probe 116 and the tunnel current signal produced by the tunnel current detecting circuit 122 are then fed to a signal selecting circuit 124, which picks up either one of the signals and forwards it to a Z-servo control circuit 126. The Z-servo-control circuit 126 transmits a signal to a hold circuit 128 to operate the XYZ-driving piezoelectric member 114 in such a manner that the signal (probe displacement signal or tunnel current signal) it receives from the signal selecting circuit 124 is held to a predetermined reference value which is provided by a D/A converter 101. The reference value may be determined by using a first method with which it is set, prior to the start of a scanning operation, to the displacement corresponding to a situation where the distance between the probe and the sample give rise to a satisfactory flow of tunnel current or a second method with which it is selectively set to a value applicable to the probe displacement signal or a value applicable to the tunnel current signal during the scanning operation when the scanning is switchably carried out either in the AFM servo-control mode or in the STM servo control mode. The reference value for displacement is obtained by reading the displacement of the probe when the reading of the tunnel current agrees with the reference value for the tunnel current while the sample 112 is moved closer toward the probe 116 under a condition where a bias voltage is applied to the sample 112 and the probe 116. If the second method is used, the reference value is switched from that of a probe displacement signal to that of a tunnel current signal or vice versa exactly when the signal selecting circuit 124 is switched. The hold circuit 128 sample/-holds the output signal of the Z-servo control circuit 126 and sends its output to the XYZ-driving piezoelectric member 114 and the microcomputer 146 via an A/D converter 130. The tunnel current signal transmitted from the tunnel current detecting circuit 122 is fed to the microcomputer 146 via an A/D converter 132 and a lock-in amplifier 136. The lock-in amplifier 136 sends out a tunnel dI/dV (differential conductance) signal, which tunnel dI/dV signal is also fed to the microcomputer 146 via an A/D converter 134. The lock-in amplifier 136 also sends out a modulation signal (MD) which is used as a reference of lock-in operation during estimating of the tunnel dI/dV signal, and the modulation signal is fed to an adder 138. The adder 138 adds the modulation signal to the output of the microcomputer 146 coming from it via a D/A converter 140 and sends the sum of the addition to the sample 112 as a bias voltage. The microcomputer 146 conducts various measurements, controlling the operation of the components and transmits the data obtained by measurements to the host computer 148, which stores and displays the data.

Referring now to FIG. 5, the procedure of determining the reference value by means of the above second method will be described. When the probe displacement signal is selected by the signal selecting circuit 124, the D/A converter 101 transmits a signal representing the AFM reference value to select the AFM servo-control mode (ST1). The hold circuit 128 is set to a sampling state or a servo state (ST2). The XYZ-driving piezoelectric member 114 moves the sample 112 and place it at the point of measurement (ST3). The hold circuit 128 transmits a Z-servo signal to the XYZ-driving piezoelectric member 114 in order to move the sample 112 to a point where the distance between the probe and the sample corresponds to the reference value of the probe displacement signal. Under this condition, the probe 116 is set to a reference atomic force Z-servo position as indicated by (C1) in FIG. 11. Then, the Z-servo signal fetched from the hold circuit 128 is A/D converted by the A/D converter 130 and fed to the microcomputer 146 as AFM image data (ST4).

Thereafter, the hold circuit 128 is set to a holding state (ST5). As the tunnel current signal is selected by the signal selecting circuit 124, the STM reference value signal is selected as the output of the D/A converter 101 to set the STM servo-control mode in operation (ST6). Then, the hold circuit 128 is set back to the servo state (ST7). The hold circuit 128 transmits a Z-servo signal to the XYZ-driving piezoelectric member 114 in order to cause the distance between the probe and the sample to show a value corresponding to the reference value of the tunnel current signal. Consequently, the probe 116 is placed at the reference current Z-servo position as indicated by (C2) in FIG. 11. Under this condition, the Z-servo signal of the hold circuit 128 is A/D converted by the A/D converter 130 and fed to the microcomputer 146 (ST8).

Subsequently, the hold circuit 128 is set to a holding state again (ST9). The voltage fed from the D/A converter 140 is gradually changed to change the bias voltage applied to the sample 112. Under this condition, the tunnel current signal and the tunnel dI/dV signal are A/D converted respectively by the A/D converters 132 and 134 and fed to the microcomputer 146 as tunnel spectral data (ST10) to terminate the scanning operation at the point where the probe 116 is placed in ST3.

Finally, it is examined if the point where the probe 116 is placed is the final point for scanning in order to determine to either continue or terminate the scanning operation (ST11). If the scanning operation needs to be continued, the procedure returns to ST1 and the probe is set to the next point for scanning at ST3 so that the procedure of FIG. 5 may be repeated. If it is found at ST11 that the point is the final point for scanning, the scanning operation will simply be completed.

Figure 7A:
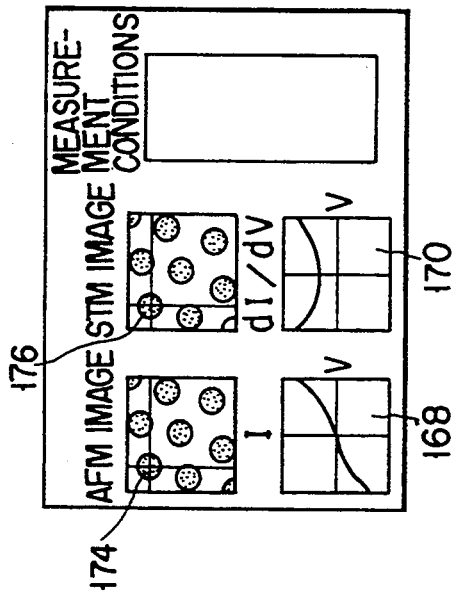
FIGS. 7A and 7B are typical images appearing on the display screen of the embodiment of FIG. 4 when the procedure of FIG. 5 is followed.
Figure 7B:
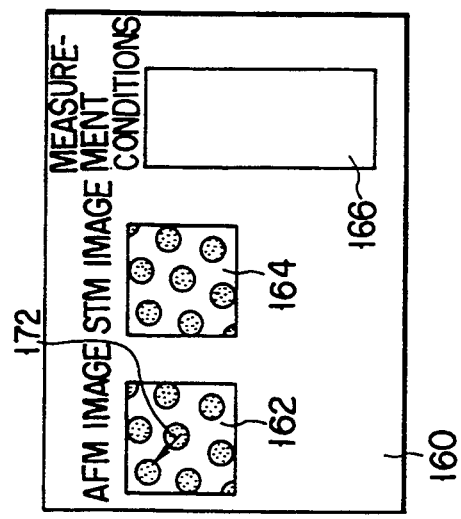

The data obtained by using the above procedure are displayed on the display screen of the host computer 148. The display screen 160 is so designed as to show an AFM image 162, a STM image 164 and the parameters of measurement 166 as illustrated in FIG. 7A. As shown in FIG. 7B the tunnel spectral data, or the I/V (spectroscopic) data 168 and the dI/dV (differential conductance) data 170, of a specific spot can be displayed on the display screen by maneuvering a mouse 150 connected to the host computer 148 and pointing to the spot with an arrow cursor 172 as cross cursors 174, 176 appear on the screen to identify the spot.

Figure 6:
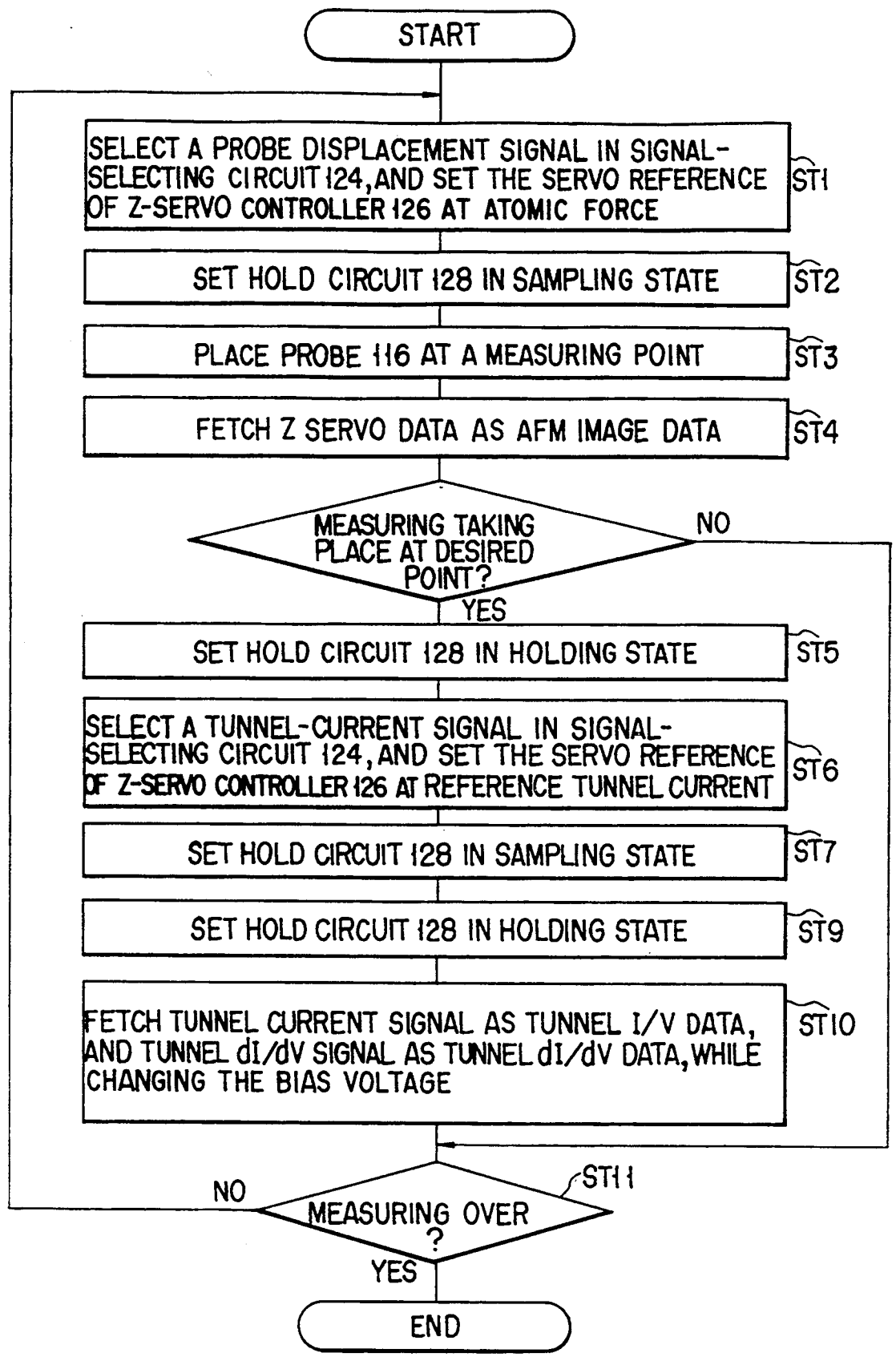
FIG. 6 is a flow chart illustrating an alternative procedure of conducting a measurement by using the embodiment of FIG. 4.

FIG. 6 shows a flow chart showing an alternative procedure of measurement. In this procedure, the step of fetching a Z-servo signal as STM image data is omitted and a step of determining if the selected point of scanning is the designated point of spectral measurement or not is inserted immediately after the step of fetching a Z-servo signal as AFM image data (ST4). If the selected point is the point of spectral measurement, an operation of spectral measurement is carried out in a manner as described above by following the steps starting from ST5. If the selected point is not the point of spectral measurement, the operation skips to immediately before ST11. Thus, an action of switching from the AFM servo-control mode to the STM servo-control mode or vice versa takes place only at points of tunnel spectral measurement so that the overall time required for a complete cycle of measurement may be significantly reduced.

Figure 8A:
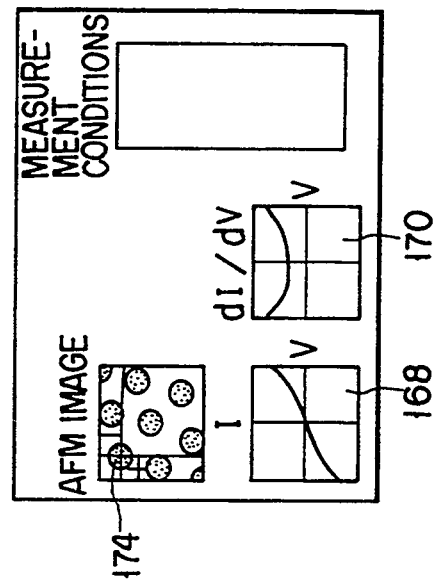
FIGS. 8A and 8B are images similar to those of FIGS. 7A and 7B but obtained by following the procedure of FIG. 6.
Figure 8B:
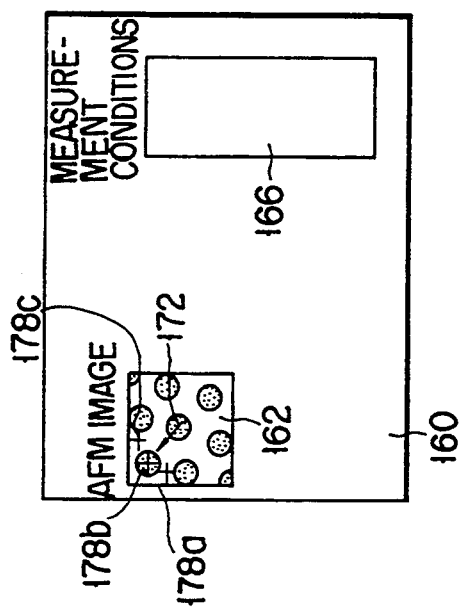
Figure 12:
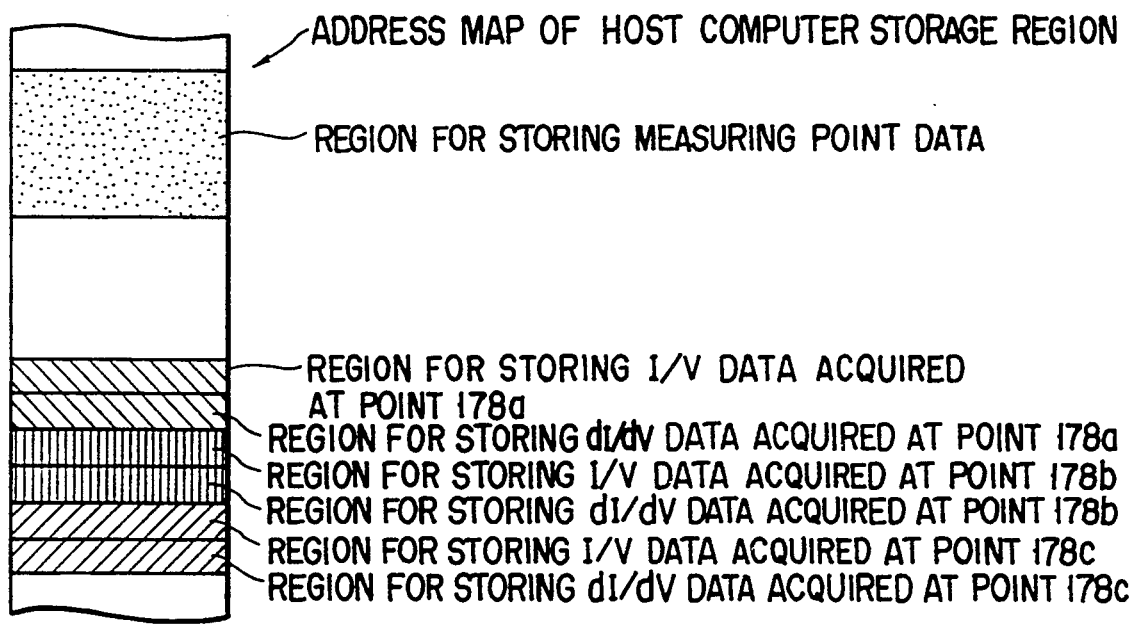
FIG. 12 is a schematic illustration of an address map for the storage area of the host computer of the embodiment of FIG. 4.

The obtained data are then displayed on the display screen of the host computer 148. The display screen 160 shows an AFM image 162 and the parameters of measurement 166 as illustrated in FIG. 8A. The AFM image is produced by reading and displaying the data of a specific storage area of the address map of the memory of the host computer for storing obtained data. The displayed AFM image 162 also shows marks 178a through 178c representing the points of spectral measurement. Again, as shown in FIG. 8B, the I/V data 168 and the dI/dV data 170 of a specific spot 178b can be displayed on the display screen by maneuvering a mouse 150 connected to the host computer 148 and pointing to the spot with an arrow cursor 172 as cross cursors 174 appear on the screen to identify the spot. For this, the data stored in the I/V measurement data storage area and those stored in the dI/dV measurement data storage area for the spot 178b are read from the address map of the memory of the host computer as illustrated in FIG. 12.

FIG. 9 is a circuit diagram of a scanning probe microscope obtained by modifying the embodiment of FIG. 4, adding an A/D converter 152 so that the probe displacement signal can be fed to the microcomputer 146 as data. In this modified embodiment, a three dimensional image can be obtained by fetching the probe displacement signal as data for displacement in the Z-direction while XY-scanning the sample in the STM servo-control mode so that the fetched data can be processed along with the X- and Y-scanning signals. Additionally, the displacement of the probe in terms of the distance between the probe and the sample along the tunnel current flowing therebetween can be obtained by analyzing the probe displacement signal in the STM servo-control mode so that a three dimensional image can be produced by analyzing the servo-control mode signal referring to displacement of the probe, while XY-scanning the sample in the automatically selected AFM servo-control mode. It is also possible to carry out the operation of tunnel spectral measurement for every or selected spots during the XY-scanning, setting the hold circuit 128 to a holding state either in the AFM servo-control mode or after switching it to the STM servo-control mode.

The host computer 148 then displays on its display screen 160 an AFM image 162 and a servo-control mode image 180 obtained by scanning the sample in the AFM mode and setting the AFM servo reference value to the displacement of the probe in the distance between the probe and the sample along the tunnel current. The data obtained by the tunnel spectral measurement in the AFM mode are also displayed on the display screen 160 as illustrated in FIG. 10B.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A scanning probe microscope for observation of a surface of a sample, comprising:
    a conductive probe;
    a cantilever for holding said probe at a free end of said cantilever, the free end of said cantilever being displaced by a force existing between said probe and the sample;
    displacement detecting means for detecting said displacement of the free end of said cantilever, and for sending out a displacement signal representing a magnitude of said displacement, and wherein a reference displacement value is predetermined;
    bias voltage applying means for applying a potential difference between the sample and said probe;
    electric current detecting means for detecting a current flowing between said probe and the sample, and for sending out a current signal representing a changing rate of said current detected by said electric current detecting means, and wherein a reference current value is predetermined;
    control means for controlling the distance between said probe and the sample so as to hold one of said displacement signal and said current signal equal to the corresponding reference value, said control means including:
        first comparison means for comparing said current signal with said reference current value;
        second comparison means for comparing said displacement signal with said reference displacement value;
        selector means for selecting an output signal from one of said first comparison means and said second comparison means; and
        servo means for controlling the distance between said probe and the sample to hold the value of the selected output signal at zero;
    scanning means for scanning said probe across a surface of the sample; and
    image processing means for forming images of said sample surface by processing positional data from said scanning means and data from said control means.

2. A scanning probe microscope according to claim 1, wherein the current is a tunnel current.

3. A scanning probe microscope according to claim 1, further comprising a display apparatus for displaying the formed images.

4. A scanning probe microscope according to claim 1, further comprising a memory means for storing the formed images.

5. A scanning probe microscope according to claim 1, wherein:
    said first comparison means comprises a logarithmic amplifier for converting the current signal into a logarithmic signal and a first differential amplifier for generating and transmitting a difference signal representing the difference between the logarithmic signal and the current reference value; and
    said second comparison means comprises a second differential amplifier for generating and transmitting a difference signal representing the difference between the displacement signal and the reference displacement signal.

6. A scanning probe microscope according to claim 1, wherein said selector means comprises:
    first switch means for feeding one of the output signals from said first and second comparison means to said servo means; and
    change-over means for operating said first switch means according to the output signal not selected by said first switch means.

7. A scanning probe microscope according to claim 6, wherein said change-over means comprises:
    a first comparator for comparing the output signal of said first comparison means with a first offset voltage and for sending out a binary signal representing the polarity of the result of comparison;
    a second comparator for comparing the output signal of said second comparison means with a second offset voltage and for sending out a binary signal representing the polarity of the result of comparison; and
    second switch means for selecting one of the binary signals from the first and second comparators, said first switch means operating for signal selection according to the selected binary signal from said second switch means.

8. A scanning probe microscope according to claim 7, wherein said second switch means comprises:
    a switch; and
    a delay circuit,
    the delay circuit receiving the binary signal from said switch and feeding the binary signal back to said switch after delaying it for a predetermined interval, and
    said switch connecting one of said first and second comparators to said first switch means in accordance with the polarity of the delayed signal.

9. A scanning probe microscope according to claim 8, wherein:
    the scanning means comprises a scanning circuit for generating and transmitting scanning signals,
    the servo means comprises a servo circuit for generating and transmitting a servo signal,
    the scanning means and servo means commonly have a piezoelectric actuator for three-dimensionally moving the sample according to the scanning signal from the scanning means and the servo signal from the servo means, and
    the image processing means comprises an arithmetic unit for multiplying the servo signal with the piezoelectric constant of the piezoelectric actuator and for sending out a product signal representing the product of multiplication, an adder for adding the product signal and the displacement signal and for sending out a sum signal representing the sum of addition, and an image processing unit for producing an image of the surface of the sample representing the configuration of the surface by synchronizing and processing the sum signal and the scanning signal.

10. A scanning probe microscope according to claim 9, wherein the image processing unit produces an image representing the distribution of current flowability on the surface of the sample by synchronizing and processing the current signal and the scanning signal.

11. A scanning probe microscope according to claim 10, wherein the image processing unit produces an image representing the distribution of current flowability in the form of binary data on the surface of the sample by synchronizing and processing the binary signal from the switch and the scanning signal.

12. A scanning probe microscope according to claim 1, wherein:
the scanning means comprises a scanning circuit for generating and transmitting scanning signals,
the servo means comprises a servo circuit for generating and transmitting a servo signal,
the scanning means and servo means commonly have a piezoelectric actuator for three-dimensionally moving the sample according to the scanning signal from the scanning means and the servo signal from the servo means, and
the image processing means comprises an arithmetic unit for multiplying the servo signal with the piezoelectric constant of the piezoelectric actuator and for sending out a product signal representing the product of multiplication, an adder for adding the product signal and the displacement signal and for sending out a sum signal representing the sum of addition, and an image processing unit for producing an image of the surface of the sample representing the configuration of the surface by synchronizing and processing the sum signal and the scanning signal.

13. A scanning probe microscope according to claim 12, wherein the image processing unit produces an image representing the distribution of current flowability on the surface of the sample by synchronizing and processing the current signal and the scanning signal.

14. A scanning probe microscope for observation of a surface of a sample, comprising:
a conductive probe;
a cantilever for holding said probe at a free end of said cantilever, the free end of said cantilever being displaced by a force existing between said probe and the sample;
displacement detecting means for detecting the displacement of the free end of said cantilever, said displacement detecting means including means for sending out a displacement signal representing a magnitude of said displacement, and means for converting said displacement signal into binary displacement data;
bias voltage applying means for applying a potential difference between the sample and said probe, said bias voltage applying means including means for generating binary bias voltage data corresponding to said potential difference, and means for converting said binary bias voltage data into an analog bias signal;
electric current detecting means for detecting a current flowing between said probe and the sample, said electric current detecting means including means for sending out a current signal representing a changing rate of said detected current, and means for converting said current signal into binary current data;
control means for controlling the distance between said probe and the sample so as to hold one of said displacement signal and said current signal equal to a corresponding one of a predetermined reference displacement value and a predetermined reference current value, said control means including means for generating binary Z-servo data, and means for converting said binary Z-servo data into an analog servo signal;
scanning means for scanning said probe across a surface of the sample, said scanning means including means for generating binary scanning data, and means for converting said binary scanning data into analog scanning signals, said scanning means and said control means commonly having a piezoelectric actuator for three-dimensionally moving the sample according to said analog scanning and servo signals; and
image processing means for forming images of said sample surface, said image processing means including means for processing said binary displacement data and said binary current data, and for synchronizing them with said binary scanning data.

15. A scanning probe microscope for observation of a surface of a sample comprising:
a conductive probe;
a cantilever for holding said probe at a free end of said cantilever, the free end of said cantilever being displaced by a force existing between said probe and the sample;
displacement detecting means for detecting a displacement of the free end of said cantilever, and for sending out a displacement signal representing a magnitude of said displacement, and wherein a reference displacement value is predetermined;
bias voltage applying means for applying a potential difference between the sample and said probe;
electric current detecting means for detecting a current flowing between said probe and the sample, and for sending out a current signal representing a changing rate of said current detected by said electric current detecting means, and wherein a reference current value is predetermined;
control means for controlling the distance between said probe and the sample so as to hold one of said displacement signal and said current signal equal to the corresponding reference value;
scanning means for scanning said probe across a surface of the sample; and
image processing means for forming images of said sample surface by processing positional data from said scanning means and data from said control means;
said scanning means and said control means commonly having a piezoelectric actuator for three-dimensionally moving the sample;
said scanning means including means for supplying scanning signals to said piezoelectric actuator so as to move the sample along a plane perpendicular to an axis of said probe according to said scanning signals;
said control means including a signal selecting circuit means for selecting one of said displacement signal and said current signal, a servo circuit for generating and transmitting a servo signal to hold said selected signal at the corresponding reference value, and a hold circuit for sampling and holding said servo signal and supplying it to said piezoelectric actuator so as to move the sample along the axis of said probe according to said sampled servo signal; and said image processing means including means for forming an image of said sample surface by processing said servo and scanning signals in synchronization, and means for fetching said displacement signal as data.

16. A scanning probe microscope for observation of a surface of a sample comprising:

a conductive probe;

a cantilever for holding said probe at a free end of said cantilever, the free end of said cantilever being displaced by a force existing between said probe and the sample;

displacement detecting means for detecting a displacement of the free end of said cantilever, and for sending out a displacement signal representing a magnitude of said displacement, and wherein a reference displacement value is predetermined;

bias voltage applying means for applying a potential difference between the sample and said probe;

electric current detecting means for detecting a current flowing between said probe and the sample, and for sending out a current signal representing a changing rate of said current detected by said electric current detecting means, and wherein a reference current value is predetermined;

control means for controlling the distance between said probe and the sample so as to hold one of said displacement signal and said current signal equal to the corresponding reference value;

scanning means for scanning said probe across a surface of the sample; and image processing means for forming images of said sample surface by processing positional data from said scanning means and data from said control means;

said scanning means and said control means commonly having a piezoelectric actuator for three-dimensionally moving the sample;

said scanning means including means for supplying scanning signals to said piezoelectric actuator so as to move the sample along a plane perpendicular to an axis of said probe according to the scanning signals;

said control means including a signal selecting circuit means for selecting one of said displacement signal and said current signal, a servo circuit for generating and transmitting a servo signal to hold said selected signal at the corresponding reference value, and a hold circuit for sampling and holding said servo signal and supplying it to said piezoelectric actuator so as to move the sample along the axis of said probe according to said sampled servo signal;

said bias voltage applying means including voltage regulating means for modifying said potential difference; and said image processing means including means for forming an image of said sample surface by processing said servo signal and said scanning signals in synchronization, means for fetching a bias value signal (V) representing said potential difference, means for fetching said current signal (I), and means for obtaining I/V conductance data representing a dependency of said current to said potential difference from the I and V signals.

17. A scanning probe microscope according to claim 16, wherein said image processing means comprises:

a lock-in amplifier for transmitting a tunnel dI/dV signal on the basis of the current signal it receives as well as a modulation signal; and means for obtaining dI/dV data representing a changing rate of the current to a change of the potential difference from the bias value signal and the tunnel dI/dV signal.

18. A scanning probe microscope according to claim 17, wherein said voltage regulating means comprises:

variable power supply means for transmitting a voltage signal while modifying the voltage signal; and an adder for adding the voltage signal and the modulation signal, the output of said adder being applied to the sample as the potential difference.

* * * * *